Aug. 16, 1966 G. C. JOHNSON 3,266,941
FUEL CELL AND FUEL CELL OPERATION OXIDIZING HYDROGEN SULFIDE
Filed June 26, 1962 2 Sheets-Sheet 1
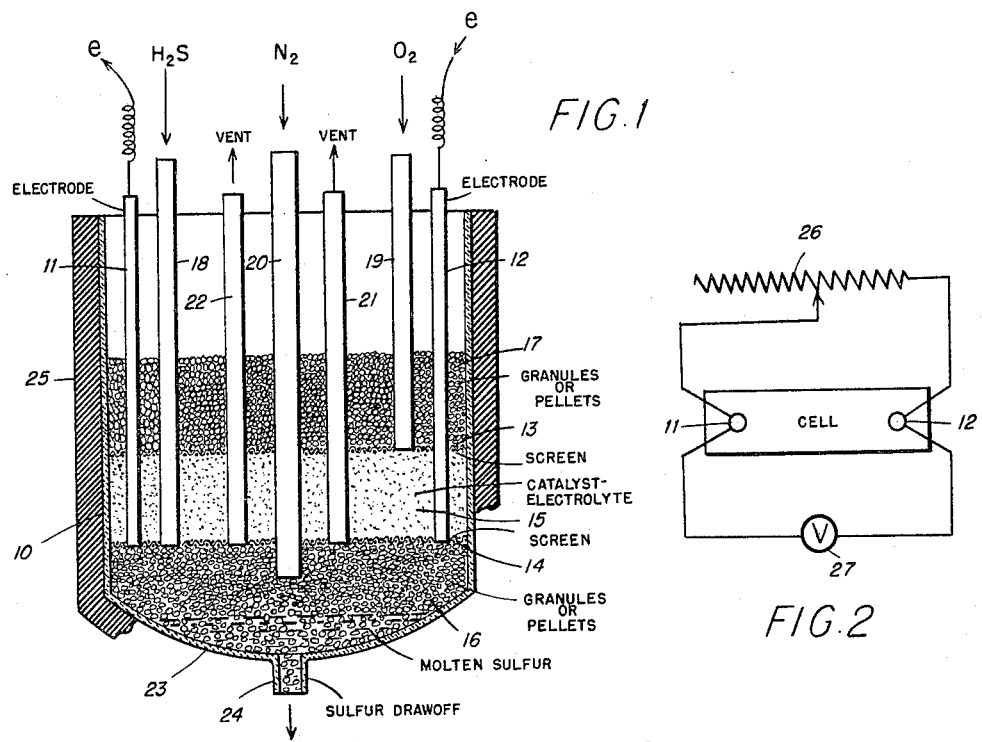
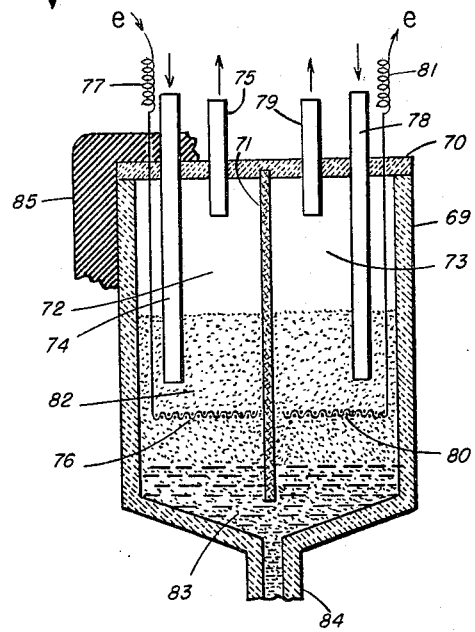

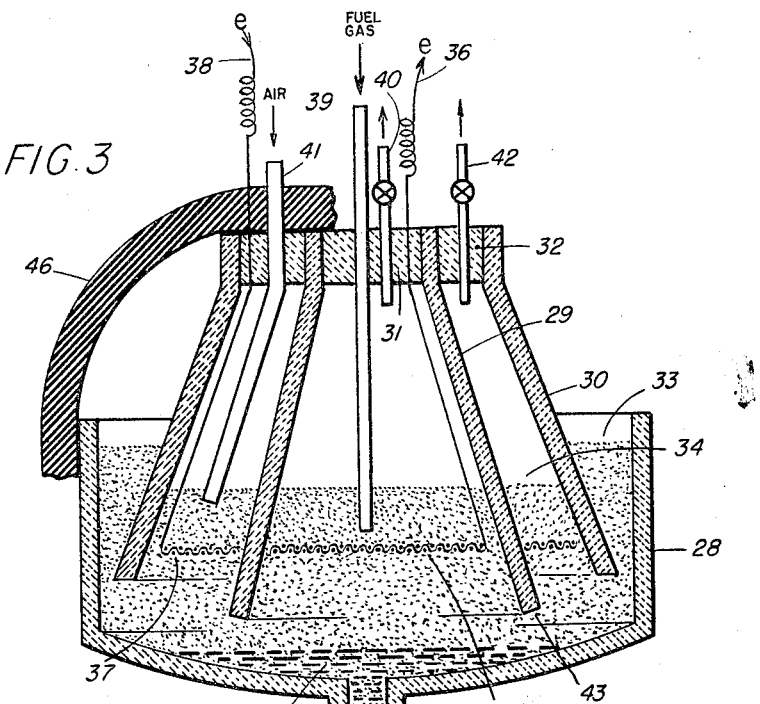
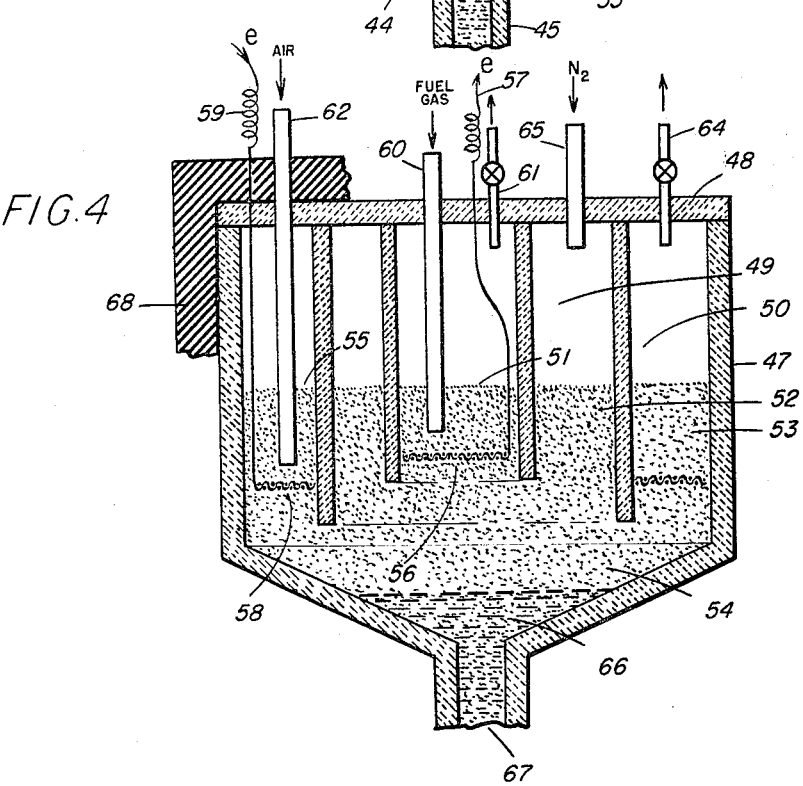

United States Patent Office 3,266,941
Patented August 16, 1966

3,266,941
FUEL CELL AND FUEL CELL OPERATION
OXIDIZING HYDROGEN SULFIDE
George C. Johnson, Woodbury, N.J., assignor to Mobil
Oil Corporation, a corporation of New York
Filed June 26, 1962, Ser. No. 205,437
9 Claims. (Cl. 136—86)

This invention is directed to a fuel cell and fuel cell operation capable of deriving power from oxidation reactions, and particularly from the oxidation of hydrogen sulfide and gases containing hydrogen sulfide.

It has been disclosed in United States Patent 2,971,824 that hydrogen sulfide, either alone, or in gases such as natural gas containing hydrogen sulfide, can be oxidized by conducting a mixture of hydrogen sulfide and oxygen into a body of aluminosilicate material. The end products of such oxidation are water and sulfur, if the operation is properly conducted. The operation, when conducted at proper temperatures, permits the recovery and withdrawal of molten sulfur from the reaction zone.

The overall reaction is:

$$2H_2S + O_2 \rightarrow 2S + 2H_2O$$

This invention is based upon the discovery that the reaction may be handled as two electrode reactions, with the production and consumption of electrons, as follows:

$$2H_2S \rightarrow 2S° + 4H^+ + 4 \text{ electrons}$$
$$O_2 + 4 \text{ electrons} + 4H^+ \rightarrow 2H_2O$$

It is further based upon the fact that the same material that is catalytic to these reactions is ion-conductive.

The object of this invention therefore is to provide a fuel cell setup capable of handling this reaction and similar oxidative reactions.

A specific object of this invention is to provide a fuel cell comprising an ion-conductive material which is also catalytic to the oxidation reaction to be conducted therein.

Another specific object is the provision of a fuel cell assembly adapted to gas phase reactions of oxidation and reduction with the accompaniment of power production.

Another specific object is the provision of a process for the conversion of hydrogen sulfide to water vapor and sulfur, together with the recovery of sulfur therefrom and the production of electric power.

The accomplishment of these objects and other objects which may appear hereinafter may be explained by the following discussion and drawings.

In the drawings:

FIGURES 1, 3, 4, 5 illustrate various forms in which a fuel cell for this operation may be set up.

FIGURE 2 shows a simplified wiring diagram applicable to all forms of cell.

FIGURES 1 and 4 show means for isolating the anode and cathode areas by flowing inert gas.

FIGURE 3 shows an arrangement without such gas seal and

FIGURE 5 shows a mechanical form of compartment separation.

In FIGURE 1, which is highly diagrammatic, but based upon an actual experimental setup, 10 is a container, which may be ceramic, provided with electrodes 11 and 12 and internally divided into three horizontal compartments by screens 13 and 14. The space between these screens is filled with the powder-form catalyst-electrolyte 15, the space below screen 14 is filled with a granular or pellet form solid 16 and the space above screen 13 with a granular or pellet form solid 17. The electrodes 11 and 12 extend into the catalyst-electrolyte material 15. Near electrode 11 there is provided an inlet tube 18 for fuel extending well into catalyst-electrolyte material 15, and near electrode 12 a similar inlet tube 19 is provided for the introduction of air or oxygen. Inlet tube 18 may be extended, if desired, into the granular solid 16 which can then, in company with screen 14 act to diffuse the fuel, ($H_2S$) upward into the catalyst-electrolyte surrounding electrode 11. Similarly inlet tube 19 may terminate above screen 13 to provide diffusion of the oxygen downward into the catalyst-electrolyte 15. Between the cathode area and the anode area there is provided an inlet tube 20 and two vents 21 and 22 whereby an inert gas such as nitrogen may be admitted at a pressure slightly above that placed upon inlet 18 and inlet 19. Vents 21 and 22 are perforate throughout the length of their embedment. By this means, the area intermediate the anode area and the cathode area may be purged or swept to prevent migration of reactants. When operated for the oxidation of $H_2S$, at high temperatures, molten sulfur, as a product of the reaction, accumulates at 23 and may be drawn off at 24. The other product of reaction, water, escapes as vapor with the excess oxygen, with unconsumed air and nitrogen if air is used, and additionally through the inert gas sweeping system. In order to keep the sulfur liquid, and for any high temperature reaction, arrangement may be insulated as indicated at 25.

Desirably the granular solids 16 and 17 are aluminosilicates of the same type and kind as powdered material 15.

In FIGURE 2, there is shown a wiring diagram applicable to any fuel cell or fuel cell test setup, wherein 11 and 12 are the electrodes, as in FIGURE 1; 26 is any external loading, which may be variable, and 27 is a voltage measuring device.

FIGURE 3, again diagrammatic, shows a very simple form of cell composed of a container 28, circular in form, an inner funnel shaped device 29, and an intermediate funnel shaped device 30. The upper ends of 29 and 30 are closed by sealing devices 31 and 32. Catalyst-electrolyte material, in fine particulate form, is placed inside to the levels indicated by 33, 34. A metallic screen 35, circular in form, is placed inside device 29 and connected to lead 26, so that it may act as an electrode. A similar metal screen 37, annular in form is placed in the annulus between 29 and 30, and is connected to lead 38, forming a second electrode. Fuel gas, for example $H_2S$, is introduced to the interior of 29 through inlet 39, and excess fuel gas is withdrawn through outlet 40 which is valved to permit control of back pressure. Oxygen or air is admitted to the annular space between 29 and 30 by inlet 41, and if air is used, excess air, nitrogen and water vapor are removed through outlet 42, also valved to control back pressure. By good control of back pressures at 40 and 42, correlated with the pressure drop necessary for gas passage through the catalyst-electrolyte below the downward extremity 43 of device 29, transport of gases between the anode compartment between 29 and 30 and the cathode compartment within 29 may be prevented. 43, the downward extremity of 29, may be prolonged to assist in this control. As before, when oxidizing $H_2S$, molten sulfur will collect at 44 and may be withdrawn through outlet 45. For high temperature operation, the device should be insulated, as indicated at 46. Ceramic materials are appropriate for Items 28, 29, 30, 31 and 32.

FIGURE 4, also diagrammatic, shows a container 47, equipped with a cover 48, from which depend partitions 49 and 50 defining a central space 51 and two annular spaces 52 and 53. These Items, 47, 48, 49, and 50, may be ceramic. The interior of container 47 is filled with particle-form catalyst-electrolyte material 54 to the level indicated at 55. A circular metal screen 56 and lead 57 form an electrode within chamber 51. Another metallic screen 58 and lead 59 form a second electrode in annular chamber 53. Fuel gas, for example $H_2S$, is introduced to chamber 51 through inlet 60, any excess being removed through valved outlet 61. Oxygen or air is admitted to annular chamber 53 through inlet 62 and excess gas vented through valve outlet 64. An inert gas, such as nitrogen, is led into annular chamber 52 by inlet 65, and by proper adjustment of inert gas inlet pressure and the back pressure at outlets 61 and 64, this inert gas flows from annular chamber 52 into chambers 51 and 53, thus preventing the migration of fuel gas and oxidizing gas between anode compartment 53 and cathode compartment 51. As before, if H$_2$S is being oxidized, molten sulfur will collect at 66 to be withdrawn at 67, and the vessel may be insulated as indicated at 68.

FIGURE 5, again diagrammatic, shows a different separation of the anode and cathode compartments. In this figure 69 is a container, and 70 is at its top closure. These items may be ceramic. Dependent from cover 70, there is a partition member 71. Member 71 is an ion exchange membrane, one of the several forms of infusible, insoluble ion-exchange members known to the art. Its function is to divide the anode compartment from the cathode compartment without ionic isolation while permitting the use, as catalyst-electrolyte, of an amount of aluminosilicate in each compartment to permit the proper completion of the desired reactions. This member 71 may be either dependent from cover 70 or mounted in the front and back walls of 69 with proper sealing at the edges and to prevent the passage of gases from one chamber to the other. At the bottom, it may extend into the lower extremity of the chamber, where, in operation on H$_2$S, it may be sealed off by molten sulfur, or it may terminate merely far enough into the catalyst-electrolyte to minimize downward diffusion of gases. This partition divides the interior of container into two compartments 72 and 73. In compartment 72, there is an inlet pipe 74 for oxygen or air, and an outlet pipe 75. There is also a metallic screen electrode 76, attached to a lead 77. In compartment 73, there is fuel inlet 78, fuel outlet 79, metallic electrode screen 80, and lead 81. Both compartments are filled with catalyst-electrolyte material 82 to a level above the end of the inlet pipes 74 and 78. Molten sulfur, if operating on H$_2$S, will collect at 83 to be drawn off at 84. Insulation may be provided, as indicated at 85.

As discussed in U.S. Patent 2,971,824, a wide selection of aluminosilicate materials of the general nature of zeolites may be used for the oxidation of H$_2$S. These materials are generally of the formula:

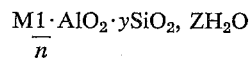

$$\frac{M1}{n} \cdot AlO_2 \cdot ySiO_2, ZH_2O$$

where M is a metal and $n$ is its valence, and $1/y$ is the atomic ratio of Al to Si. For any specific crystalline zeolite, the ratio $1/y$ or, better, $y/1$, has a rather definite range of values. The above formula shows the hydrated salt form of the zeolite. By removing water, the zeolite composition is activated. Such compounds are presently widely known, varying in crystalline structure, several series of structures being designated as A, X, and Y, respectively. They are characterized by microporosity with pores of rather definite size. Zeolite 5A is a zeolite of interatomic structure type A and pores of about 5 angstrom units in diameter; Zeolite 13X is a zeolite of interatomic structure type X and has pores of about 9 to 10 angstrom units in diameter. As indicated in U.S. Patent 2,971,824, such materials having a pore diameter of at least about 5 A. are generally useful for the oxidation of H$_2$S, operating at temperatures of the order of 200–400° C.

For use in the fuel cell setup, the catalyst-electrolyte material hereinbefore referred to may be the activated alkali metal salt form of the zeolitic materials described, or it may be any of these materials in which a portion of the alkali metal cations have been replaced by other cations.

It is preferred, however, that at least a portion of the zeolitic material used to be in the acid or H-form. This "H" form may be arrived at in several ways. A common way is by conducting an ion exchange operation with an ammonium salt, to replace the metal cation with an ammonium cation, and then heating to drive off the ammonia. Another procedure is by leaching with an acid, such as dilute HCl, followed by drying. These procedures could be so conducted as to get complete removal of metal cation, but should be stopped short of that limit, since with some zeolitic material, a high removal of metal cations results in collapse of crystalline structure. In general, those zeolitic materials with a higher atomic ratio of silica to alumina will better retain structure in the acid form. No critical limit can be introduced in this because various metal cations confer different stabilities for a given degree of change to the H-form. It is noted that when an H-form aluminosilicate is used, it should be one which is structurally stable.

In an experimental setup of the type of FIGURE 1, but arranged without the inert gas to prevent diffusion between cathode and anode, the following results were obtained. An electromotive force of .35 volt was obtained after approximately one hour of operation, in which the temperature adjacent the H$_2$S inlet ranged from 290–310° C. and that in the oxygen portion of the cell ranged from 180–370° C. As the H$_2$S diffusion throughout the catalyst-electrolyte body increased the concentration around the oxygen electrode, the temperature at that area rose to the limit noted, the resistance dropped, and the cell was shut down, it being realized that a diffusion barrier was necessary for continuous operation.

It is also contemplated that other oxidations of gaseous materials may be conducted in a fuel cell as described herein, particularly the oxidation of hydrogen, of carbon monoxide, and of hydrocarbon gases, such as propane, or of naturally existing gaseous mixtures, such as natural gas containing hydrogen sulfide.

In general, in such operations (where there is no product such as free sulfur to be removed) the temperature of operation would be maintained high enough to effect the removal of any water formed by reaction as vapor. This would prevent the deactivation of the aluminosilicate material by its recapture of water. The temperature should not be so high as to completely remove water from an aluminosilicate which can be activated to a satisfactory degree by partial removal of water. Nor should it be so high as to cause structural change of the ordered aluminosilicate structure. These requirements should not hamper the reactions contemplated, for complete removal of water from most zeolites requires temperatures above the melting point of sulfur, and most zeolites, even in the acid form, and particularly those of high Si/Al content, are heat-stable above temperatures here contemplated.

The hydrogen sulphide reaction described herein will usually be initiated upon the introduction of the fuel, and the temperature will rise as the reaction proceeds. Other reactions may require heating to initiate them. Such heating may be either external or internal. A very convenient way to accomplish internal heating may be by heating the reactant gases to initiate the reaction, or by introducing heated inert gases until the bed is at a proper temperature to initiate reaction.

I claim:

1. A fuel cell for the production of power from the oxidation of a gaseous fuel comprising spaced anode and cathode regions each having an electron conductor extending therein, means for introducing an oxygen-containing oxidizing gas to the cathode region, means for introducing fuel gas to the anode region, an electrolyte in each region and disposed therebetween comprising a porous ion-conductive crystalline aluminosilicate zeolite of ordered structure having a pore diameter of at least 5 Angstrom units, said zeolite being at least partially dehydrated and in the form of fine particles, said zeolite being active to catalyze the oxidation of the fuel gas in the anode region, thereby producing electrons, said zeolite also being active to catalyze the reduction of the oxidizing gas in the cathode region, thereby consuming electrons, and means for preventing diffusion of the gases from one region to the other comprising means for admitting an inert sweep gas to said electrolyte intermediate said regions, and means for venting said inert gas adjacent said admitting means, said inert gas serving to prevent mixing of said fuel and oxidizing gases.

2. A fuel cell for the production of power from the oxidation of a gaseous fuel comprising spaced anode and cathode regions each having an electron conductor extending therein, means for introducing an oxygen-containing oxidizing gas to the cathode region, means for introducing fuel gas to the anode region, an electrolyte in each region and disposed therebetween comprising a porous ion-conductive crystalline aluminosilicate zeolite of ordered structure having a pore diameter of at least 5 Angstrom units, said zeolite being at least partially dehydrated and in the form of fine particles, said zeolite being active to catalyze the oxidation of the fuel gas in the anode region, thereby producing electrons, said zeolite also being active to catalyze the reduction of the oxidizing gas in the cathode region, thereby consuming electrons, and means for preventing diffusion of the gases from one region to the other comprising an ion-permeable gas-impermeable membrane disposed in said electrolyte intermediate said regions and dividing one region from the other.

3. A fuel cell for the production of power from the oxidation of a gaseous fuel comprising spaced anode and cathode regions each having an electron conductor extending therein, means for introducing an oxygen-containing oxidizing gas to the cathode region, means for introducing fuel gas to the anode region, an electrolyte in each region and disposed therebetween comprising a porous ion-conductive crystalline aluminosilicate zeolite of ordered structure having a pore diameter of at least 5 Angstrom units, said zeolite being at least partially dehydrated and in the form of fine particles, said zeolite being active to catalyze the oxidation of the fuel gas in the anode region, thereby producing electrons, said zeolite also being active to catalyze the reduction of the oxidizing gas in the cathode region, thereby consuming electrons, and means for preventing diffusion of the gases from one region to the other comprising gas-tight upper walls defining each region and separating one from the other, the lower portions of said regions being in communication with each other through said zeolite, and each region having valve-controlled gas venting means whereby gas pressure in one region may be maintained at a level to prevent flow therein of gas from the other region.

4. A fuel cell for the production of power from the oxidation of a gaseous fuel comprising spaced anode and cathode regions each having an electron conductor extending therein, means for introducing an oxygen-containing oxidizing gas to the cathode region, means for introducing fuel gas to the anode region, an electrolyte in each region and disposed therebetween comprising a porous ion-conductive crystalline aluminosilicate zeolite of ordered structure having a pore diameter of at least 5 Angstrom units, said zeolite being at least partially dehydrated and in the form of fine particles, said zeolite being active to catalyze the oxidation of the fuel gas in the anode region, thereby producing electrons, said zeolite also being active to catalyze the reduction of the oxidizing gas in the cathode region, thereby consuming electrons, and means for preventing diffusion of the gases from one region to the other comprising a lateral wall laterally defining one of said regions and separating the same from the other, said wall extending downwardly in said cell and into said electrolyte and being of a depth sufficient to prevent transfer of gases between said regions.

5. The fuel cell of claim 1 in which said zeolite is at least partially converted to the acid form thereof.

6. The fuel cell of claim 2 in which said zeolite is at least partially converted to the acid form thereof.

7. The fuel cell of claim 3 in which said zeolite is at least partially converted to the acid form thereof.

8. The fuel cell of claim 4 in which said zeolite is at least partially converted to the acid form thereof.

9. A fuel cell for the production of power from the oxidation of a gaseous fuel comprising spaced anode and cathode regions each having an electron conductor extending therein, means for introducing an oxygen-containing oxidizing gas to the cathode region, means for introducing fuel gas to the anode region, an electrolyte in each region and disposed therebetween comprising a porous ion-conductive crystalline aluminosilicate zeolite of ordered structure having a pore diameter of at least 5 Angstrom units, said zeolite being at least partially dehydrated and in the form of fine particles, said zeolite being active to catalyze the oxidation of the fuel gas in the anode region, thereby producing electrons, and said zeolite also being active to catalyze the reduction of the oxidizing gas in the cathode region, thereby consuming electrons.

References Cited by the Examiner

UNITED STATES PATENTS

| | | | |
|---|---|---|---|
| 2,631,180 | 3/1953 | Robinson | 136—86 |
| 2,901,524 | 8/1959 | Gorin et al. | 136—86 |
| 2,971,824 | 2/1961 | Johnson et al. | 136—86 |
| 3,040,115 | 6/1962 | Moos | 136—86 |
| 3,041,252 | 6/1962 | Eisenman et al. | 204—1 |
| 3,056,647 | 10/1962 | Amphlett | 23—14.5 |
| 3,097,116 | 7/1963 | Moos | 136—86 |
| 3,138,490 | 6/1964 | Tragert | 136—86 |
| 3,150,998 | 9/1964 | Reilemeier | 136—86 |
| 3,186,875 | 6/1965 | Freeman | 136—153 |

WINSTON A. DOUGLAS, *Primary Examiner.*

JOHN R. SPECK, *Examiner.*

H. FEELEY, *Assistant Examiner.*